United States Patent [19]

Cox, Jr. et al.

[11] 4,076,442
[45] Feb. 28, 1978

[54] APPARATUS FOR CONTROLLING COOLANT FLOW IN ACCORDANCE TO EXTERNAL FORCES UPON A CUTTING TOOL

[75] Inventors: Joseph Henry Cox, Jr.; William Andrew Haggerty, both of Cincinnati, Ohio

[73] Assignee: Cincinnati Milacron, Inc., Cincinnati, Ohio

[21] Appl. No.: 774,759

[22] Filed: Mar. 7, 1977

[51] Int. Cl.² .................. B23B 39/04; B23B 27/10
[52] U.S. Cl. .................................. 408/8; 408/56; 408/59; 408/11
[58] Field of Search ............... 408/6, 8, 11, 56, 57, 408/59, 60, 61

[56] References Cited
U.S. PATENT DOCUMENTS

| 1,422,031 | 7/1922 | Caulkins | 408/8 |
| 1,789,841 | 1/1931 | Rennick | 408/56 |
| 1,846,211 | 2/1932 | Krueger | 408/8 |
| 3,287,996 | 11/1966 | Doyle | 408/56 |
| 3,521,526 | 7/1970 | Olig et al. | 408/56 |
| 3,720,135 | 3/1973 | Merner et al. | 408/11 |

Primary Examiner—Harrison L. Hinson
Attorney, Agent, or Firm—James D. Liles

[57] ABSTRACT

An apparatus in a machine tool controls the flow of coolant in accordance to tool contact with a workpiece. The preferred embodiment measures and stores a torque value exerted upon a spindle motor under no-load conditions and compares this value to an operating torque value upon the same spindle motor. When the tool contacts a workpiece and the operating torque exceeds the stored no-load torque value by a predetermined amount, a solenoid operated valve is opened and coolant is permitted to the area of tool engagement with the workpiece.

12 Claims, 2 Drawing Figures

U.S. Patent      Feb. 28, 1978      4,076,442
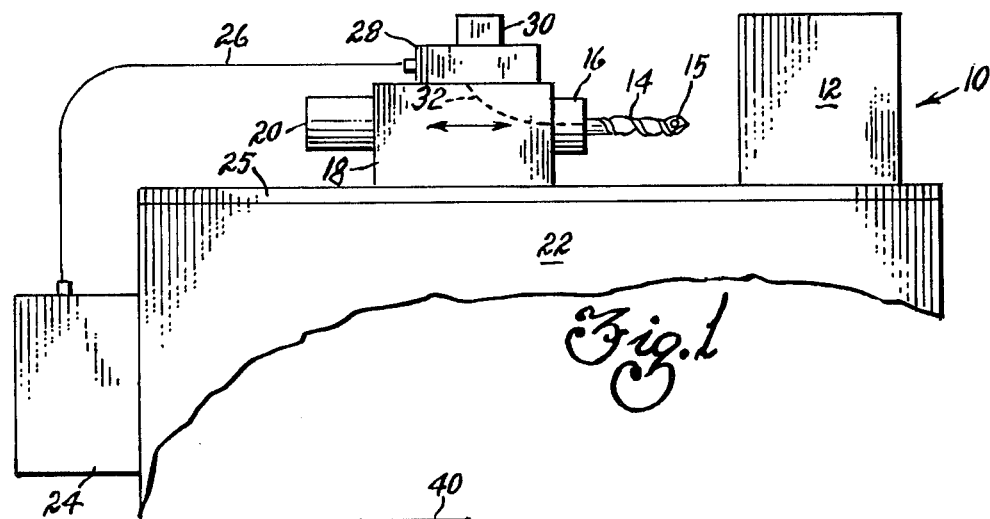
*Fig. 1*
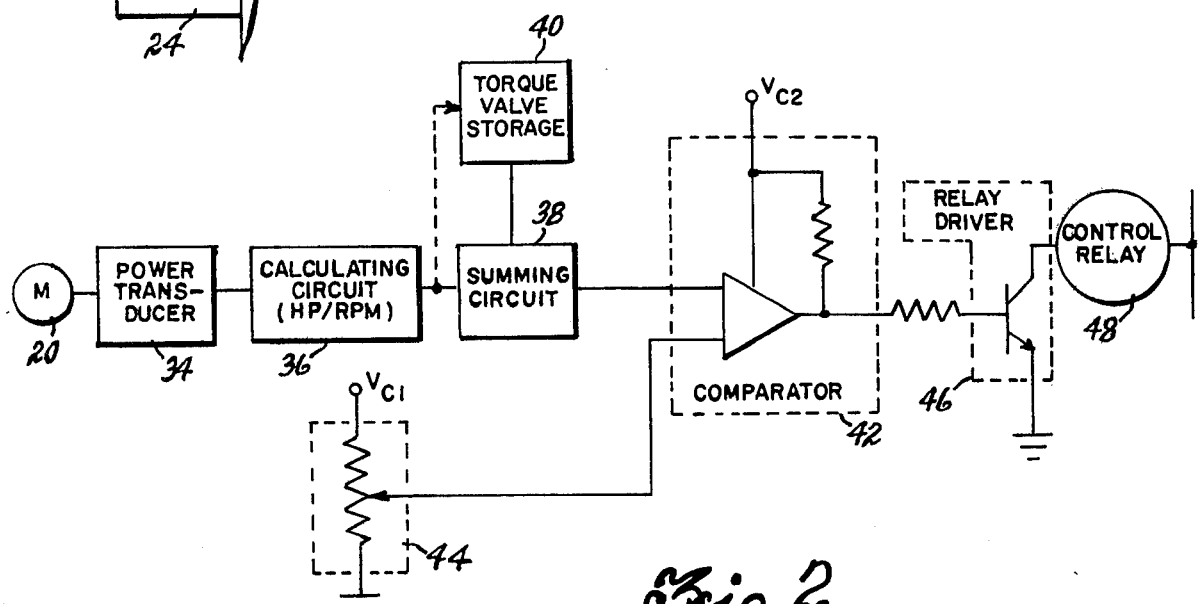
*Fig. 2*
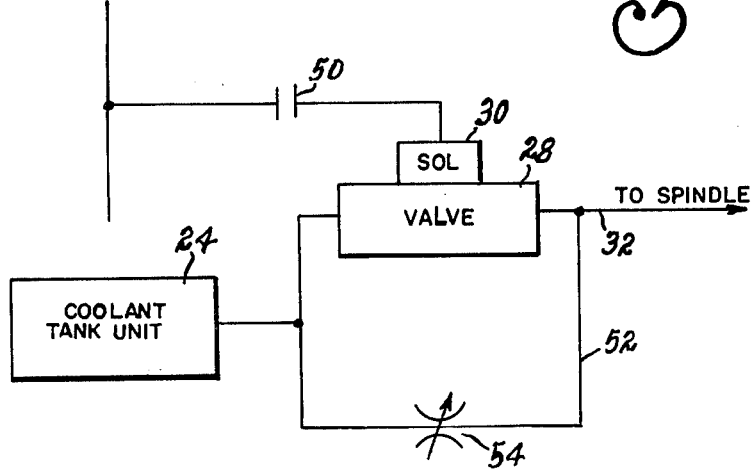

APPARATUS FOR CONTROLLING COOLANT FLOW IN ACCORDANCE TO EXTERNAL FORCES UPON A CUTTING TOOL

BACKGROUND

In metal machining operations, cutting fluids or coolants are widely used to wash away chips, reduce generated heat and to reduce the friction between a tool and a chip. In the past, the coolant has either been turned on and off manually by an operator or left running during periods when the tool is not engaged with a workpiece and coolant flow was unnecessary. The rapid cutting speeds used in modern high production machining operations accentuate the need for cutting fluids or coolants, and the modern machines frequently use coolant under high pressure and flow rates. The high pressure flow has the undesirable effect of splashing and misting areas adjacent to the machine with coolant during periods when the tool is not engaged with the workpiece. Inasmuch as the cutting fluid is not required until the tool engages the workpiece, and the actual cutting operation commences, it would be desirable to delay the high pressure flow until the fluid is actually needed and to thereby eliminate the coolant waste and inconvenience of prior art machines.

Delaying high pressure coolant flow has an additional advantage when tools with internal cutting fluid passages are used. In these tools, coolant flows through passages in a working head of the machine and through the cutting tool. The high pressure cutting fluid pushes against the tool and may dislodge it from a tool holder in some circumstances. Delaying assertion of this high pressure fluid force until the tool engages the workpiece insures that the force resulting from the fluid pressure is opposed by the engagement force of the workpiece and the possibility of tool dislodgement is reduced.

SUMMARY

A machine tool has a coolant fluid line for directing coolant to a cutting tool. A force signal is generated which is proportional to the external forces upon the cutting tool, and this signal is used to open and close a flow control valve in the coolant line which is responsive to the generated external force signal. High pressure coolant flow is permitted to flow only when the cutting tool contacts the workpiece as indicated by the external force signal. The preferred embodiment also has a restricted flow bypass around the flow control valve and permits low pressure coolant flow at small flow rates to be directed toward the cutting tool irrespective of the control valve position. This bypass insures that some coolant will be available at the tool for its initial contact with the workpiece.

BRIEF DESCRIPTION OF THE DRAWINGS

FIG. 1 shows a side elevational view of a machine tool employing one form of the invention in schematic form.

FIG. 2 is a block diagram illustrating the operation of the preferred embodiment of the invention.

DESCRIPTION OF THE PREFERRED EMBODIMENT

The invention relates to machine tools and may be used with any machining operation as, for example, milling, drilling, taping or boring and will be disclosed in the preferred embodiment in connection with a drilling machine.

Referring now to the drawings and FIG. 1 in particular, a diagrammatic representation of a drilling machine 10 for drilling holes into a workpiece 12 is shown. A drilling tool 14 is supported in a spindle 16 which is rotatably mounted in a workhead 18. The spindle 16 is powered by a spindle motor 20 attached to the workhead 18. The workhead 18 is slidably seated with respect to a base 22 of the machine tool 10 upon ways 25 in a conventional manner. The sliding movement of the workhead 18 is in the axial direction of the drilling tool 14 and permits selective engagement of the tool 14 with workpiece 12. A cutting fluid or coolant tank unit 24 is associated with the machine base 22 in a conventional manner. A flexible hose 26 extends from the tank unit 24 to a valve 28, operated by a solenoid 30. When the valve 28 is in the open position, coolant from the tank 24 flows through the hose 26, valve 28, internal passages 32 in the workhead 18, spindle 16, and through the tool 14 to the cutting area in which the tool 14 is in cutting engagement with the workpiece 12. The tool 14 is of the type with internal coolant passages which is commercially available from any of several well-known drill manufacturers. The coolant exits the tool 14 through orifices 15 in the tip and provides lubricity and cooling in the area of tool engagement with the workpiece 12 and assists in the removal of chips. Although a tool 14 with internal flow passages is shown in the preferred embodiment, it should be apparent that the invention is equally applicable to the more commonly employed type of system in which the coolant is externally applied to the tool.

FIG. 2 shows, in block diagram form, the operation of the preferred embodiment of the invention. When the tool 14 is in cutting engagement with the workpiece 12, the torque experienced by the spindle motor 20 is increased. The torque upon the motor 20 may be determined according to the equation:

$$T = K P/N$$

where
$T$ = torque upon the motor
$K$ = constant
$P$ = power required by the motor
$N$ = motor speed.

Consequently, by measuring the power drawn by the motor 20 and the motor speed, the motor torque may be computed. Accordingly, the power to spindle motor 20 is measured by a transducer 34, which might typically be a wattmeter. This value, measured by the transducer 34, is then applied to a torque calculating circuit 36 where the value is divided by the spindle motor 20 RPM; and a signal representative of the torque upon the spindle motor 20 is generated.

The torque signal generated by torque calculating circuit 36 is then communicated, as a first input to a summing circuit 38. The summing circuit 38 also receives a second input from a torque storage 40. This latter input value is representative of the torque upon the spindle motor 20 under no-load conditions and is stored during an early portion of the machine cycle before the tool 14 engages the workpiece 12. The summing circuit 38 then subtracts the stored no-load torque value from the signal generated from torque calculating circuit 36 and produces an output signal proportional to the difference between these two values. Thus, the output signal of summing circuit 38 represents the external, load-dependent, forces exerted on the spindle motor 20; and this signal may be monitored to detect engagement between and tool 14 and workpiece 12. The generation of a signal representative of the external load-dependent forces is known in the art and may be produced by any conventional method, as for example the method taught in U.S. Pat. No. 3,626,262. Alternately, the external torque may be detected by a strain gauge torque transducer as is known in the art.

The external torque signal from summing circuit 38 is then applied to comparator 42 where it is compared to a reference signal from potentiometer 44. Whenever the external torque signal from summing circuit 38 exceeds the threshold level of the reference from potentiometer 44, an output signal from comparator 42 is generated which is used as an indication that contact between the tool 14 and workpiece 12 has taken place. Because torque upon the spindle motor 20 under both load and no-load conditions will fluctuate slightly, the reference level is set at a level slightly above the magnitude of the no-load torque and any expected variations to prevent accidental triggering of the output from comparator 42 before tool contact has occurred. It is also preferable to retain the ability to vary the reference signal emanating from potentiometer 44 in order to accomodate different tooling arrangements. Accordingly, potentiometer 44 is readily variable to satisfy this requirement. Since it is comtemplated that the invention might be used upon numerically or computer numerically controlled machines, it should also be readily apparent that the potentiometer 44 may be replaced by a series of resisters that are selectively designated by input information upon a tape or magnetic storage used by the machine control.

The output of comparator 42 is applied to the base of an NPN transistor where it controls relay driver 46. Whenever the comparator 42 output is applied to the driver 46, the transistor gating switch is turned on and control relay 48 is energized. Normally open contacts 50 associated with control relay 48 are closed whenever the relay 48 is energized and the solenoid 30 is activated. The activated solenoid 30 in turn opens control valve 28, and high pressure coolant is permitted to flow from coolant tank 24 and ultimately to the area of tool 14 contact with the workpiece 16.

While the preferred embodiment monitors torque exerted upon the spindle motor to detect cutting engagement of the tool, it should be readily apparent that other parameters might be utilized for this purpose. It might be preferable, as for example when slide drive motors or pistons are used to effectuate relative movement between the cutting wheel and the workpiece, to measure axial force upon the cutting tool. It is important, however, that the monitored parameter be one which provides an accurate indication as to whether the tool is in cutting engagement with the workpiece.

Since the high pressure of coolant through control valve 28 will be delayed by the response time of the sensing system and the valve 28, a bypass line 52 around the valve 28 is provided to permit a low pressure flow of coolant to the tool engagement area under all conditions of machine operations and particularly during a response time of the high pressure coolant flow. A flow restrictor 54, preferably a variable resitrictor, is placed in the bypass line 52 to insure that the flow rate through the line 52 is low and that the coolant is released at a lower pressure. Thus, the bypass insures a coolant supply at the time of initial tool contact with the workpiece while eliminating the splashing and misting in adjacent areas and simultaneously reducing coolant losses.

Although the present invention has been described in conjunction with the preferred embodiment, it is to be understood that modifications and variations may be resorted to without departing from the spirit of the invention as those skilled in the art will readily understand. Such modifications and variations are considered to be within the view and scope of the present invention as defined by the appended claims.

What is claimed is:

1. In a machine tool, an apparatus for controlling the flow of a cutting fluid to a cutting tool in accordance to tool engagement with a workpiece, comprising:
    (a) a cutting tool;
    (b) a cutting fluid conduit for directing cutting fluid to said cutting tool;
    (c) means for generating a signal proportional to cutting forces upon said cutting tool; and
    (d) a flow control valve in said cutting fluid conduit, said valve being responsive to said signal and opening when said signal exceeds a predetermined threshold level.

2. An apparatus as recited in claim 1, further comprising means for generating a reference signal, said reference signal establishing said threshold level.

3. An apparatus as recited in claim 2, wherein said cutting fluid conduit extends through said cutting tool.

4. An apparatus as recited in claim 1, wherein said cutting tool is a drill.

5. An apparatus as recited in claim 1, wherein said signal is representative of a torque exerted upon the cutting tool.

6. An apparatus as recited in claim 1, further comprising bypass means for permitting a predetermined minimum quantity of cutting fluid flow around said valve irrespective of the position of said control valve.

7. In a machine tool having a cutting fluid conduit for directing cutting fluid to a cutting tool, an improved apparatus of the type in which a first signal representing the forces exerted upon a cutting tool during operating conditions is generated and compared with a second signal representing forces exerted upon the cutting tool during no-load conditions which has been generated and stored, and in which a third signal proportional to the difference between the first and second signals is further generated, wherein the improvement comprises:
    (a) a flow control valve in the cutting fluid conduit, said valve being responsive to said third signal and opening when said third signal exceeds a predetermined threshold level.

8. An apparatus as recited in claim 7, wherein said cutting tool is a drill.

9. An apparatus as recited in claim 7, wherein said cutting fluid line extends through said cutting tool.

10. An apparatus as recited in claim 7, wherein said third signal is representative of a torque exerted upon said cutting tool.

11. An apparatus as recited in claim 7, further comprising bypass means for permitting a predetermined minimum quantity of cutting fluid flow around said valve irrespective of the position of said control valve.

12. In a machine tool, an apparatus for controlling the flow of coolant to a cutting tool in accordance to tool engagement with a workpiece, comprising:
    (a) a cutting tool;

(b) means for generating and storing a first signal indicative of a torque exerted upon the cutting tool under no-load conditions:
(c) means for generating a second signal indicative of a torque exerted upon the cutting tool during tool cutting conditions;
(d) means for comparing said first and said second signals and producing a third signal indicative of the difference therebetween;
(e) means for generating a reference signal;
(f) means for comparing said third signal to the reference signal;
(g) a coolant line for directing coolant to the cutting tool;
(h) a normally closed valve in said line, said valve being responsive to said third signal and opening whenever said third signal exceeds the reference signal; and
(i) by-pass means for permitting a predetermined minimum quantity of coolant around said control valve irrespective of the valve position.

* * * * *